US012423704B2

(12) United States Patent
Lian et al.

(10) Patent No.: US 12,423,704 B2
(45) Date of Patent: Sep. 23, 2025

(54) GRAPH COMPUTING FOR ELECTRONIC COMMUNICATION RISK DETECTION

(71) Applicant: PayPal, Inc., San Jose, CA (US)

(72) Inventors: Lance Lian, Suzhou (CN); Haoran Zhang, Shanghai (CN); Jiaxin Fang, Shanghai (CN); Junshi Guo, Shanghai (CN); Pengshan Zhang, Shanghai (CN); Xia Zhang, Shanghai (CN); Yu Zhang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/059,699

(22) Filed: Nov. 29, 2022

(65) Prior Publication Data
US 2024/0144277 A1 May 2, 2024

(30) Foreign Application Priority Data
Nov. 2, 2022 (WO) ................ PCT/CN2022/129193

(51) Int. Cl.
G06Q 20/40 (2012.01)
G06F 16/901 (2019.01)
G06F 16/903 (2019.01)

(52) U.S. Cl.
CPC ..... *G06Q 20/4016* (2013.01); *G06F 16/9024* (2019.01); *G06F 16/90335* (2019.01)

(58) Field of Classification Search
CPC ............ G06Q 20/4016; G06F 16/9024; G06F 16/90335
(Continued)

(56) References Cited

U.S. PATENT DOCUMENTS 10,102,512 B1\* 10/2018 Delgrippo, Jr. ........ G06Q 20/10
10,496,768 B2  12/2019 Zhang
(Continued)

FOREIGN PATENT DOCUMENTS

CN  112740248 A   4/2021
CN  113760971 A  12/2021
(Continued)

OTHER PUBLICATIONS

V. Chang and M. Ramachandran, "Towards Achieving Data Security with the Cloud Computing Adoption Framework," in IEEE Transactions on Services Computing, vol. 9, No. 1, pp. 138-151, Jan. 1-Feb. 2016. (Year: 2016).\*
(Continued)

*Primary Examiner* — Virpi H Kanervo
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for detecting risk via a server system that receives, based on user activity at a device, an indication of a trigger event corresponding to a potential electronic communication. After receiving the trigger event indication and prior to receiving an indication of initiation of the electronic communication, the system executes a set of computations for the communication, including performing a multi-hop query to a graph database storing a graphical representation of a plurality of communications and storing results of the execution. In response to initiation of the electronic communication, the system retrieves, using information corresponding to entities involved in the electronic communication, one or more portions of the results of executing the set of computations the database. The system determines, based on the retrieved results, whether to approve the electronic communication. The disclosed tech-
(Continued)

niques may advantageously decrease unsecure electronic communications relative to real-time risk detection techniques.

20 Claims, 9 Drawing Sheets

(58) Field of Classification Search
 USPC .......................................................... 705/44
 See application file for complete search history.

(56) References Cited

U.S. PATENT DOCUMENTS

| | | | |
|---|---|---|---|
| 10,592,485 B1* | 3/2020 | Morgan | G06F 16/252 |
| 11,068,384 B2 | 7/2021 | Zhang | |
| 11,221,876 B2 | 1/2022 | Wu | |
| 11,310,366 B1 | 4/2022 | Dhandapani et al. | |
| 11,442,920 B2 | 9/2022 | Zang | |
| 11,455,238 B2 | 9/2022 | Zhang | |
| 11,586,617 B2* | 2/2023 | Church | G06F 16/9024 |
| 2018/0060341 A1 | 3/2018 | Wu | |
| 2020/0310994 A1* | 10/2020 | ChoFleming | G06F 15/8007 |
| 2020/0409931 A1 | 12/2020 | Zang | |
| 2021/0073287 A1* | 3/2021 | Hunter | H04L 63/123 |
| 2021/0334312 A1 | 10/2021 | Neo | |
| 2022/0004580 A1 | 1/2022 | Li | |
| 2022/0122074 A1* | 4/2022 | Sharma | G06Q 20/401 |
| 2022/0129447 A1* | 4/2022 | Wang | G06Q 50/04 |
| 2022/0237565 A1* | 7/2022 | Dzierzanowski | G06Q 10/103 |
| 2023/0120186 A1 | 4/2023 | Huang et al. | |

FOREIGN PATENT DOCUMENTS

| | | | | |
|---|---|---|---|---|
| CN | 113779286 A | * | 12/2021 | G06F 16/51 |
| CN | 115033722 A | * | 9/2022 | G06F 16/51 |
| KR | 20190020800 A | * | 3/2019 | |
| WO | WO-2012092576 A1 | * | 7/2012 | G06F 17/30292 |
| WO | WO-2013116308 A1 | * | 8/2013 | G06F 17/30958 |

OTHER PUBLICATIONS

D. Cashman et al., "CAVA: A Visual Analytics System for Exploratory Columnar Data Augmentation Using Knowledge Graphs," in IEEE Transactions on Visualization and Computer Graphics, vol. 27, No. 2, pp. 1731-1741, Feb. 2021. (Year: 2021).*

Ma, Jun, et al. "GraphRAD: a graph-based risky account detection system." Proceedings of ACM SIGKDD conference, London, UK. vol. 9. (Year: 2018).*

International Search Report and Written Opinion in PCT Appl. No. PCT/CN2022/129193 mailed Jul. 12, 2023, 7 pages.

* cited by examiner

GRAPH COMPUTING FOR ELECTRONIC COMMUNICATION RISK DETECTION

PRIORITY CLAIM

The present application claims priority to PCT Appl. No. PCT/CN2022/129193, entitled "Graph Computing for Electronic Communication Risk Detection," filed Nov. 2, 2022, which is incorporated by reference herein in its entirety.

BACKGROUND

Technical Field

This disclosure relates generally to electronic communication processing, and, more specifically, to techniques for processing data for electronic communications in a near-real-time manner.

Description of the Related Art

As more and more communications (e.g., transactions, emails, messages, etc.) are conducted electronically via online processing systems, for example, these processing systems become more robust in managing data for these communications as well as detecting suspicious and unusual behavior. Many communication requests for a computer system may be submitted with malicious intent, often resulting in wasted computer resources, network bandwidth, storage, CPU processing, etc., if those communications are processed. Some communication processing systems attempt to analyze various communication data for previously processed and currently initiated communications to identify and mitigate malicious behavior such as requests for fraudulent transactions.

DETAILED DESCRIPTION

Figure 1:
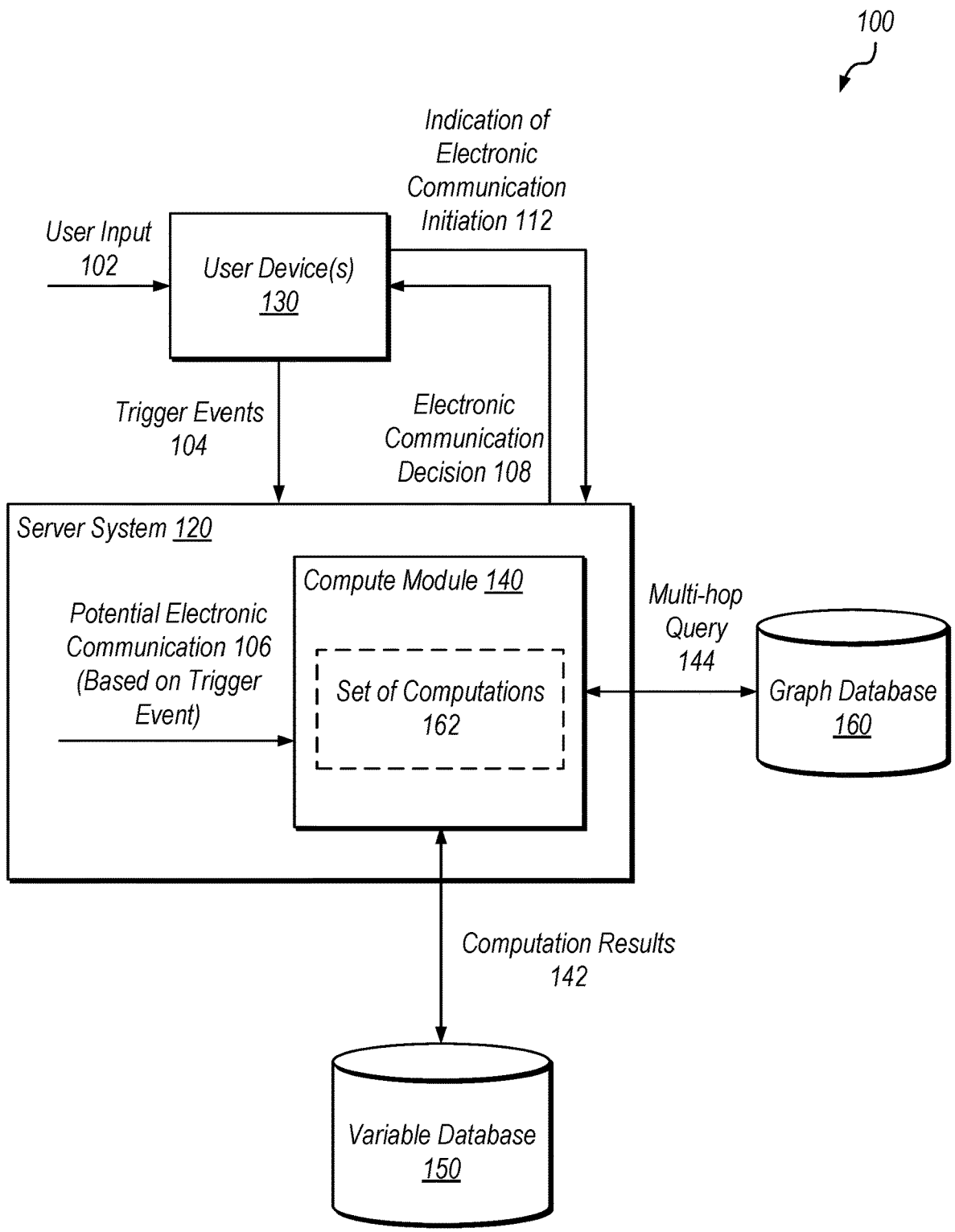
FIG. 1 is a block diagram illustrating an example system configured to perform computations, including multi-hop queries, for potential electronic communications, according to some embodiments.

As the processing bandwidth of different entities increases, retrieving and manipulating data for such entities (e.g., to generate a summary of the data, to perform various data analytics processes on the data, etc.) becomes increasingly time and resource-intensive. For example, some entities may be associated with billions of completed electronic communications, with millions of new communications being processed on a monthly, weekly, daily, etc. basis. As one specific example, a transaction processing system (e.g., PayPal™) may process transactions for multiple different clients. In this specific example, a given client may initiate transactions with millions of different users per day. In some situations, the slow retrieval and processing of transaction data may lead to a poor user experience. For example, when transaction data is being retrieved to generate a statistical report (such as a graphical depiction of transaction data that includes graph nodes and edges) for the entity associated with the retrieved transactions or when data is being retrieved to perform a risk analysis (e.g., to determine whether to approve the transaction). Further in this example, if transaction data is being retrieved for risk analysis, the time allowed for analysis of retrieved data may be limited by various service level agreements (SLAs) corresponding to different clients. For example, one client may have an SLA specifying that once a transaction has been initiated by a user, an authorization decision for this transaction must be generated within e.g., 150 milliseconds. As such, the types and extent of risk analyses executed for transactions after such transactions are initiated is limited. In disclosed techniques, a risk analysis executed after a transaction is initiated is referred to as a "synchronous" risk analysis. In contrast to synchronous data retrieval and risk analysis, the disclosed retrieval and analysis of data may be performed within e.g., 200, 400, 600, etc. milliseconds due to at least a portion of the disclosed retrieval and analysis being performed prior to a transaction being initiated.

Due to the growing number of variables being included in a graphical representation of transaction data as well as the SLA's discussed above, transaction data being retrieved from the graphical representation of transaction data (a graph with graph nodes representing entities (e.g., merchants, users, etc.) involved in transactions and edges between graph nodes representing transactions between the entities represented by the graph nodes) during synchronous risk analysis may be limited to two-hop intervals (between graph nodes). In disclosed techniques, graph nodes are vertices within an electronic communication graph that represent entities (user, merchants, etc.) that participated in different electronic communications e.g., transactions. In contrast, compute nodes (discussed in further detail below) represent computations (such as queries) within a set of computations to be performed for a trigger event. Further in this example, SLA's may cause limitations in the number of edges between each graph node hop in the graphical representation of the transaction data that are allowed to be retrieved and analyzed. The limitations presented by SLA's may, in turn, cause delays in processing of electronic communications (leading to poor user experience) as well as a decrease in the catch rate of risk detection systems utilizing synchronously retrieved transaction graph data. In disclosed techniques, an electronic communication graph (e.g., a transaction graph) includes graph nodes representing entities that participated in electronic communications and graph edges representing the electronic communications themselves. Electronic communication graphs store data associated with the different electronic communications (e.g., account data, transaction amounts, transaction types, etc.)

To combat the decrease in performance caused by synchronous data retrieval and risk analysis, the disclosed techniques provide asynchronous computations to be made on graphed transaction data. For example, "asynchronous" data retrieval and analysis includes actions executed after a trigger event associated with a potential transaction and before the potential transaction has been initiated. Asynchronous computations may also be referred to herein as "near-real-time" computations. For example, while near-real-time computations are not computed after a transaction is initiated, they are computed close (prior) to when a transaction is initiated and thus these computations allow for much more complex capabilities relative to synchronous computations. Near-real-time computation refers to actions that are performed prior (but also close) to a transaction being initiated.

A server system executing asynchronous computations, in disclosed techniques may be referred to herein as a graph database system. In various embodiments, the disclosed techniques begin an asynchronous computation process in response to various trigger events. As one specific example, trigger events may include any of various activity of a user at an interface of their computing device. For example, trigger events may include browser object model (BOM) events which include actions taken by a user that are tracked via their browser or via a user interface displayed by an application on their device, including, but not limited to: an account login request, browsing activity (e.g., viewing certain items or content), scrolling activity, selection activity (e.g., adding an item to a shopping cart), a request to view one or more user interfaces (e.g., requesting to view a shopping cart), etc. In disclosed techniques, such events trigger an asynchronous computation process that is completed prior to a final event occurring (e.g., before a transaction corresponding to a prior user activity trigger event is initiated).

In disclosed techniques a server system may provide various services (e.g., web services) in which the computing resources of the server system perform computing operations on behalf of a requesting entity, such as an end user. For example, a transaction service may also provide various services such as a graphing service, a risk detection service, an authentication service, etc. While a risk detection system performing synchronous risk analysis may be limited in that it is unable to access various other services due to risk analysis time limitations imposed by various SLAs, for example, the disclosed asynchronous risk analysis is able to utilize transaction information made available via various other services.

The disclosed techniques may advantageously provide for complex computations via asynchronous execution. The disclosed techniques may further advantageously provide for quick and efficient retrieval of large amounts of asynchronously computed transaction data based on variable identifiers corresponding to asynchronously computed variables. In addition, the disclosed techniques provide continuous and efficient updates to stored transaction data as transactions are initiated over time without decreasing the performance of queries made on the non-relational database storing the transaction data. The efficient querying provided by disclosed techniques may, in turn, advantageously allow transaction processing systems to quickly analyze transaction data to identify suspicious behavior and, thereby, mitigate potential future suspicious (and potentially fraudulent) behavior. Such techniques may advantageously decrease the amount of computer resources necessary to perform such queries as well as decreasing loss (e.g., financial, user trust, etc.) associated with suspicious transactions.

Example Server System

FIG. 1 is a block diagram illustrating an example system configured to perform computations, including multi-hop queries, for potential electronic communications. In the illustrated embodiment, system 100 includes one or more user devices 130, a graph database 160, a variable database 150, and a server system 120, which in turn includes compute module 140.

In the illustrated embodiment, user input 102 is received at user device(s) 130. For example, a first user may scroll through a listing of items on their smartphone, while a second user may draft an email via their desktop computer. These two forms of input from two different devices are examples of trigger events 104 that are shown as being transmitted from user device(s) 130 to server system 120. In some embodiments, trigger events 104 are based on activity other than user input. For example, if a user device 130 enters a specific geographic location, this may be a triggering event. User device(s) 130 may be any of various portable or stationary devices including smart devices (e.g., tablets, phones, watches, etc.), desktop computers, laptops, etc. In disclosed techniques, trigger events 104 may be one or more of the following actions: creating a new account, scrolling, browsing, an account login, selections, viewing a cart, drafting an email, entering a geographic location, etc. In some embodiments, trigger events are received by server system 120 based on BOM events tracked at browsers displayed via user devices 130. For example, BOM events may include activity occurring within a browser window of an end user computing device: a navigation event, an input event, a location event, a screen event, and a history event.

Server system 120, in the illustrated embodiment, receives trigger events 104 from one or more user devices 130. In various embodiments, server system 120 also receives information associated with the trigger events 104 and information associated with a user and the user device 130 at which the trigger event occurred. For example, the user and device information may indicate a name of the user, the user account, the type of device being used, etc. Server system 120 inputs the indication of a potential electronic communication 106 into compute module 140 based on a given trigger event 104 received from a user device 130. For example, a trigger event 104 indicates that there is potential that an electronic communication may be initiated at the user device 130 shortly (e.g., within the next few seconds, minutes, hours, etc.). Server system 120 may also input the information about the user and their device into compute module 140. Further, server system 120 may retrieve additional information corresponding to the user or device 130 (e.g., the additional information may indicate an account history of the user, including prior fraudulent activity of the user).

Compute module 140, in the illustrated embodiment, selects a set 162 of computations for the potential electronic communication 106. The set 162 of computations is a set of asynchronous computations. In disclosed techniques, set 162 of computations makes up a computation graph such as a DAG. Server system 120 may execute compute module 140 to automatically select a set 162 of computations for the potential electronic communication 106 based on the trigger event associated with the communication and the information received from the user device 130 (information about the user and the device corresponding to the trigger event). For example, compute module 140 may generate a DAG for the potential electronic communication 106. In other situations, compute module 140 may present a set of suggested computations to an administrator associated with the trigger event (e.g., a merchant entity selling an item viewed by a user, where the item viewing caused the trigger event) and allow the administrator to alter the suggested set of computations for the trigger event. In still other situations, an administrator may personalize various sets of computations to be executed in response to different types of trigger events. As one example, a first, small set of compute nodes may be triggered in response to a user scrolling past an item, while a second, larger set of compute nodes may be triggered in response to a user requesting to view their shopping cart. In this example, a user viewing their shopping cart indicates a higher likelihood that the user will initiate the potential transaction than the user scrolling activity as discussed in further detail below with reference to FIG. 2.

During execution of the set 162 of computations, compute module 140 accesses graph database 160 by executing one or more multi-hop queries 144. As discussed in further detail below with reference to FIG. 4, computations in a given set 162 may include performance of multiple different queries to graph database 160. For example, a given computations includes querying an electronic communication graph stored in graph database 160 to retrieve historical electronic communication data (e.g., that may be stored for later risk detection for a potential electronic communication). Graph database 160 is an efficient, real-time graph database system that stores graphs with large quantities of vertices (also referred to as graph nodes) and edges and is optimized to efficiently retrieve the data from the vertices and edges in a real-time environment. The graph database system may data in terms of structures, such as graphs, rather than tables, for example. These graphs may include graph nodes (representing entities, such as end users) and edges (representing electronic communications). In contrast to graph database 160 which may store electronic communication data in the form of graphs, variable database 150 (as discussed in further detail below with reference to FIG. 6) stores results of sets 162 of computations in the form of key-value pairs. For example, a given computation may be a query executed on graph database 160 that retrieves electronic communication data and then stores the result in variable database. For example, variable database stores variables generated via execution of DAGs (one example of set 162 of computations) on the graph database 160 that stores graphed e.g., transaction data.

The computations performed as part of set 162 may also include various calculations and determination operations, including execution of machine learning models. For example, a computation may include both data retrieval operations that are associated with the potential electronic communication 106 from graph database 160 and data input operations that include inputting communication data into a machine learning model trained to identify risk associated with the potential communication 106. In some situations, computations performed by module 140 may include making calls to various external systems or services, such as an enterprise data management (EDM) service, a risk detection service, a risk unified computing service, a graph processing service, etc.

In the illustrated embodiment, after executing the set 162 of computations for a given trigger event, compute module 140 stores computation results 142 in variable database 150. Database 150 may be a non-relational, distributed database having database instances stored across various geographic locations. Variables calculated during asynchronous computations may be stored in a database for evaluation during a risk analysis process. For example, the disclosed system 100 may be a database management system that stores asynchronously computed variables in a non-relational database (such as database 150) using key-value pairs, where keys for these key-value pairs include an identifier (ID) associated with the entity corresponding to the trigger event for the asynchronously computed variables.

The non-relational database utilized to store transaction data provides distributed, scalable, big data storage. As one specific example, the disclosed database management system may utilize an Apache Hbase™ datastore. Variable database 150 and graph database 160 may be executed via Apache HBase™, Apache Cassandra™, Redis™, etc. For example, databases 150 and 160 may include a plurality of different database regions (instances) maintained by a plurality of region servers. In some situations, the region servers are geographically distributed. Due to their ability to store data across multiple different regions, databases 150 and 160 are able to store billions of rows of data and, thus, may be utilized in big data scenarios. The database regions that may be included in databases 150 and 160 are a contiguous, sorted range of rows that are stored together. Billions of rows of data may be split into hundreds, thousands, millions, etc. of regions. The database regions may be distributed evenly among various region servers.

A row within the database 150 stores transaction data for a given transaction and the row keys of each row include at least a sender ID (e.g., an account identifier of the sender) and a receiver ID (e.g., an account identifier of the sender). The row value of a given row within the database stores asynchronously computed variables for a given transaction, such as the computed transaction amount (e.g., the dollar amount), the computed number of neighboring graph nodes for one or both entities involved in the given transaction, a number of flagged transactions for the account initiating the given transaction (e.g., a number of transactions initiated from this account that were flagged as fraudulent), whether the entity associated with the given transaction is laundering money, etc. Queries on the data stored in database 150 may include account numbers of entities involved in a given transaction as well as identifiers for variables stored for this transaction as discussed in further detail below with reference to FIG. 6. As one specific example, a query requesting to retrieve the calculated dollar amount for a given transaction may include both of the account IDs for the two entities involved in the given transaction as well as the variable key "usdAmount." This query will retrieve the value stored in the "usdAmount" column for the transaction corresponding to the two account identifiers included in the query. Alternatively, a variable key may be a query key such as a query number or column number.

In some embodiments, server system 120 receives user requests from one or more user devices 130. These user requests may originate from various users of server system 120 and may initiate processing of transactions. For example, server system 120 may be a transaction processing system configured to process transactions requested by various users. In such situations, user devices 130 belong to individual users e.g., that have accounts with the transaction processing system and utilize transaction services provided by such a system. For example, user input 102 may include a request to initiate an electronic communication (e.g., a request to initiate a transaction). In response to such user input, a user device 130 may send an indication 112 of an initiation of the potential electronic communication to server system 120. Server system 120 determines whether to approve the initiated electronic communication. For example, system 120 may retrieve computation results 142 for the initiated electronic communication from database 150 and input the results into a machine learning model to detect whether the communication is risky (e.g., suspicious). Based on results of the risk assessment, system 120 generates and transmits a decision 108 for the initiated electronic communication to the user device 130 from which the indication 112 was received.

In some embodiments, a system other than server system 120 receives user requests from various user devices 130 and stores raw data generated based on requests (e.g., transaction, account, linking, etc. data) in graph database 160. For example, server system 120 may simply retrieve data from graph database 160 while another system other than system 120 stores and maintains data within database 160 based on user requests. A user request may be a request to set up an account and another system may store data for this newly set up account in database 160. Further in this example, system 120 is able to retrieve the data for the newly set up account from graph database 160 for use in generating a graph representation, which in turn is stored in database 160. In addition to storing computation results 142 in database 150 and sending decisions (such as decision 108) for electronic communications to user device 130, server system 120 updates a graph stored in graph database 160. For example, system 120 may generate a new edge (to represent potential electronic communication 106) in the graph between a graph node representing the user associated with the potential electronic communication 106, including storing any of the various computation results 142 determined for the potential electronic communication.

Server system 120 may also receive requests for raw data from one or more computing devices 130. The device(s) 130 may correspond to one or more developers of server system 120. For example, a developer computing device may monitor suspicious behavior and prevent fraudulent activity. In such situations, user input 102 received from computing device(s) include requests for transaction data, account data, linking data, etc. to determine whether activity summarized e.g., in a graphical representation indicates that various transaction activity is suspicious (and potentially fraudulent). Developers may utilize various development tools to process data obtained from server system 120. As one specific example, internal PayPal development tools utilized by fraud agents may include a web user interface tool used to display graphical data received from system 120. Another service may be executed to illustrate the graphical representation retrieved by server system 120 from graph database 160 or generated by system 120 based on data retrieved from database 160.

In this disclosure, various "modules" operable to perform designated functions are shown in the figures and described in detail (e.g., compute module 140, likelihood module 210, compute node selection module 220, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

In various embodiments, asynchronous computations support high volume multi-hop graph database queries (e.g., two or more hops), customized asynchronous computation sets for different trigger events, and use of external data sources and services. The disclosed techniques are in contrast to real-time computations which are limited to two graph database hops and non-real-time computations which may perform graph query hops but are less accurate than near-real-time computations due to a smaller amount of transaction data being available (as well as this data being less up-to-date than real-time or near-real-time computations). In addition, because the disclosed asynchronous computation techniques are computed close to when an electronic communication is initiated, these techniques may advantageously allow for more complex computation capabilities relative to non-asynchronous computations for electronic communications.

Example Graph Compute Module

Figure 2:
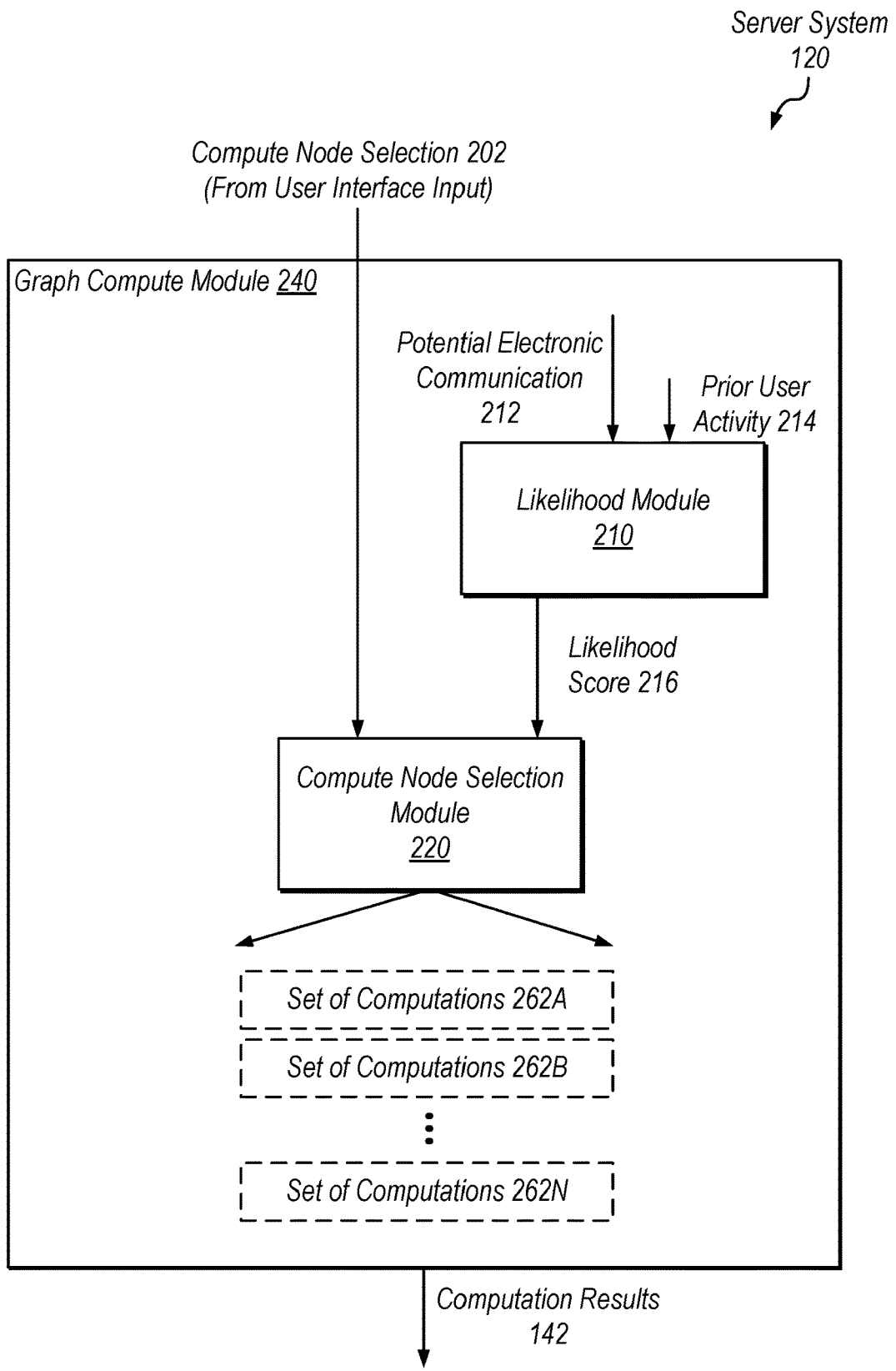
FIG. 2 is a block diagram illustrating an example graph compute module, according to some embodiments.

Turning now to FIG. 2, a block diagram is shown illustrating an example graph compute module. In the illustrated embodiment, server system 120 includes graph compute module 240 (one example of compute module 140), which in turn includes likelihood module 210 and compute node selection module 220. In other embodiments, graph compute module 240 is referred to as a service that is called by server system 120.

Graph compute module 240, in the illustrated embodiment, receives compute node selections 202. These selections 202 may be transmitted to server system 120 based on user input provided via a user interface displayed at user device(s) 130 shown in FIG. 1, for example. Module 240 provides the selections to compute node selection module 220. In addition, compute node selection module 220 receives a likelihood score 216 from likelihood module 210.

Likelihood module 210, in the illustrated embodiment, receives information corresponding to a potential electronic communication 212 (such as communication 106 shown in FIG. 1) and prior user activity 214 for a user corresponding to the potential electronic communication. Likelihood module 210 predicts the likelihood that a user will initiate the potential electronic communication 212 (e.g., likelihood that the user will request authorization of a transaction) by calculating a likelihood score 216. As one specific example, prior user activity 214 may indicate a number of transactions initiated by a user after this user clicked to view their shopping cart. In this specific example, if the user initiated 95 percent of their prior transactions after viewing their shopping cart, then likelihood module 210 may calculate a high likelihood score 216 (e.g., a 0.8 on a scale of 0 to 1, with 1 indicating that a user will initiate the transaction and 0 indicating that this user will not initiate a potential transaction). The likelihood score 216 may also be calculated based on information received for the potential electronic communication 212. For example, if the electronic communication information indicates that a user is simply scrolling past a list of items on their web browser, but has not clicked on the items, likelihood module 210 may calculate a low likelihood score 216 (e.g., 0.3) for this potential transaction.

Compute node selection module 220, in the illustrated embodiment, receives likelihood scores 216 for various different potential electronic communications (based on trigger events) and compute node selections 202 (e.g., from one of user devices 130). Based on the received information, selection module 220 generates a plurality of sets of computations 262A-262N. For example, selection module 220 may generate a first set of computations 262A to be performed for a first potential electronic communication and a second, different set of computations 262B to be performed for a second, different potential electronic communication. As discussed in further detail below with reference to FIG. 4, the different sets of computations 262A-262N may retrieve historical electronic communication data from a graph database (e.g., database 160) which illustrates communication data statistics e.g., for identifying suspicious (and potentially fraudulent) trends in the data. For example, a given computation in set of computations 262A may be a graph database query that retrieves one or more rows included in the database. In the illustrated embodiment, graph compute module 240 executes various ones of the different sets of computations 262A-262N and outputs computation results 142 based on the execution.

Example Graph Database System

Figure 3:
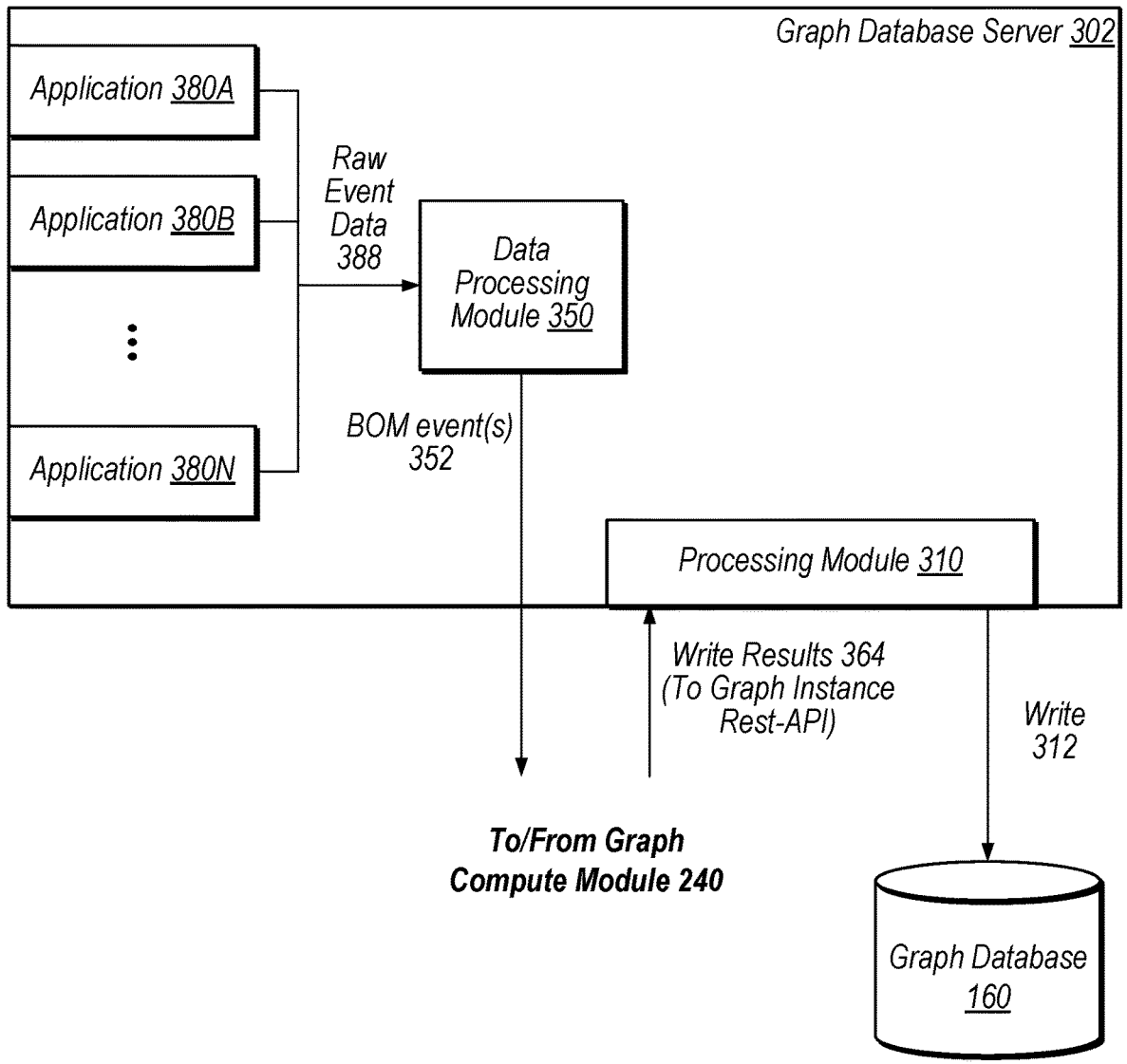
FIG. 3 is a block diagram illustrating an example graph database server, according to some embodiments.

FIG. 3 is a block diagram illustrating an example graph database server. In the illustrated embodiment, server system 120 includes graph database 160 and a graph database server 302, which in turn includes applications 380A-380N, a data ingestion module 386, a data processing module 350, and a processing module 310.

Graph database server 302, in the illustrated embodiment, receives raw event data 388 from various different applications 380A-380N. For example, applications 380A-380N may include a domain application, a data analytics platform, an enterprise data lake (EDL), and a data ingestion application, etc. In the illustrated embodiment, these applications publish raw event data via a stream processing platform (e.g., Apache Kafka or Red Hat™ AMQ) such that data processing module 350 can access the raw event data and generate BOM event(s) 352 from the raw event data 388. The data processing module 350 consumes raw event data and makes calls to one or more other services to obtain more information about the raw event data. The processing module 350 then merges the raw event data and the data obtained from other services to generate a BOM event which includes a greater amount of data than the original raw event data. Data processing module 350 outputs BOM event(s) 352 to graph compute module 240.

Figure 4A:
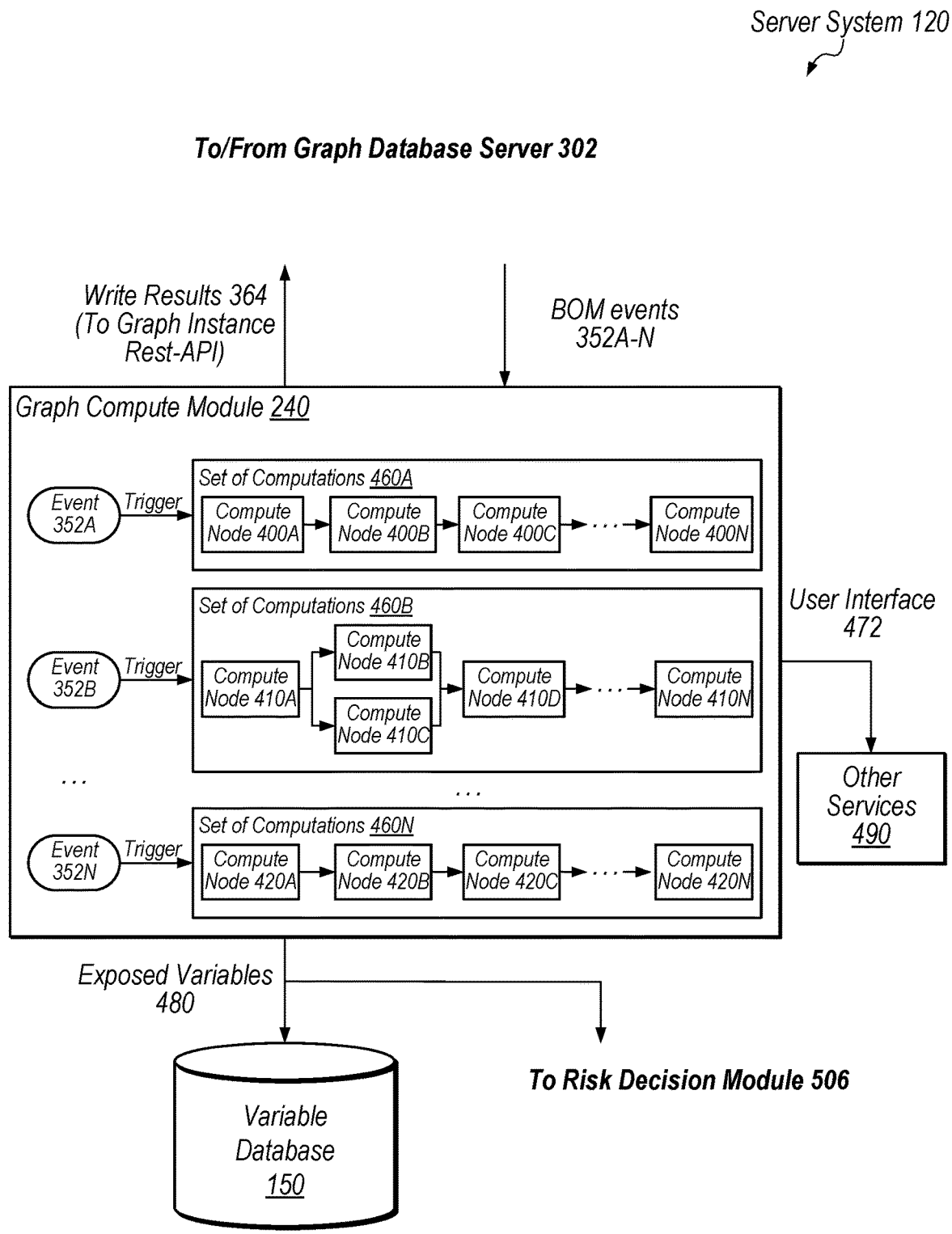
FIG. 4A is a block diagram illustrating a detailed version of the graph compute module shown in FIG. 2, according to some embodiments.

In the illustrated embodiment, graph database server 302 executes processing module 310 to receive write results 364 from graph compute module 240 (discussed in further detail below with reference to FIG. 4A) and stores them in graph database 160 via a write operation 312. For example, after a set of computations has been calculated by graph compute module 240 as shown in FIG. 4A for a given potential electronic communication, then these results are sent back to the graph database server 302 via, for example, a restful application programming interface (API) for inclusion in a graph generated from electronic communication data and stored in graph database 160. For example, write operation 312 may update one or more graphical representations stored in graph database 160 indicating transaction data. In some situations, graph database server 302 may be referred to as a graph database service that is utilized by server system 120 to provide various graphing and storage capabilities for electronic communication data.

Turning now to FIG. 4A, a block diagram is shown illustrating a detailed version of the graph compute module shown in FIG. 2. In the illustrated embodiment, server system 120 includes other services 490 and graph compute module 240, which in turn includes events 352A-352N and a plurality of different sets of computations 460A-460N.

Graph compute module 240, in the illustrated embodiment, receives BOM events 352A-352N from graph database server 302. The BOM events 352A-352N trigger different sets of computations 460A-460N, respectively. In the illustrated embodiment, event 352A triggers execution of a set of computations 460A that includes sequential execution of compute nodes 400A-400N. For example, compute node 400A executes prior to compute node 400B, which executes prior to compute node 400C, and so forth. In the illustrated embodiment, event 352B triggers execution of set of computations 460B which includes both sequential and parallel execution of compute nodes. For example, compute node 410A executes and once it is finished executing, compute nodes 410B and 410C execute in parallel (at least a portion of the actions executed via compute nodes 410B and 410C overlap), then compute node 410D executes once compute nodes 410B and 410C are complete. In the illustrated embodiment, event 352N triggers execution of set of computations 460N, which includes execution of compute nodes 420A-420N.

In some embodiments, compute nodes 400A-N, 410A-N, and 420A-N are queries. For example, compute node 400A may query graph database 160 to retrieve transaction data associated with an account corresponding to event 352A e.g., a user of a given account places an item in their cart. Further in this example, compute node 400B may determine various variables from the transaction data such as a transaction amount, a destination account, an email address, etc. Still further in this example, compute node 400C may perform machine learning operations on the variables determined from the transaction data retrieved from graph database 160 e.g., to determine a risk score for a transaction corresponding to the user of the given account placing the item in their cart.

In some embodiments, compute nodes included in different sets of computations include various different types of actions. For example, a compute node may be one or more of the following: a graph query, an output exposure, a model prediction (e.g., machine learning for risk prediction), results of calling an external service, event counter logic, user-defined compute algorithm (e.g., a clustering algorithm for a sub-graph generated via a graph query), etc. In disclosed techniques, a compute node performing queries on historical transaction data stored in the graph database (e.g., graph database 160) may perform queries to pull graph data from three or more graph nodes away from a current graph node to determine data for transactions occurring three entities away from a current entity that may request processing of a new transaction.

After executing one or more of the different sets of computations 460A-460N, graph compute module 240 exposes variables 480 that result from the different sets of computations. For example, set of computations 460A may output a set three variables, while set of computations 460B may output a set of fifty variables. In the illustrated embodiment, graph compute module 240 exposes variables 480 to risk decision module 506. In some embodiments, the exposure of variables 480 is performed via execution of an additional compute node in sets of computations 460A-460N. For example, the compute node 400N included in set of computations 460N may be a publication compute node that publishes variables determined during execution of compute nodes 400A-400(N-1). In the illustrated embodiment, graph compute module 240 also stores the exposed variables 480 in database 450. Variable database 450 is one example of the database 150 discussed above with reference to FIG. 1 and is a non-relational database. For example, variable database 450 may be implemented via Aerospike™.

In the illustrated embodiment, graph compute module 240 provides a user interface 472 to various other services 490. For example, graph compute module 240, as discussed above with reference to FIG. 2 may allow for user selection of different compute nodes for inclusion of customized sets of computations 262A-262N to be used for different entities. The user interface 472 may be a self-service user interface that provides a drag and drop editing interface to end users.

The other services 490 may include a risk detection service, a data management service, etc.

Figure 4B:
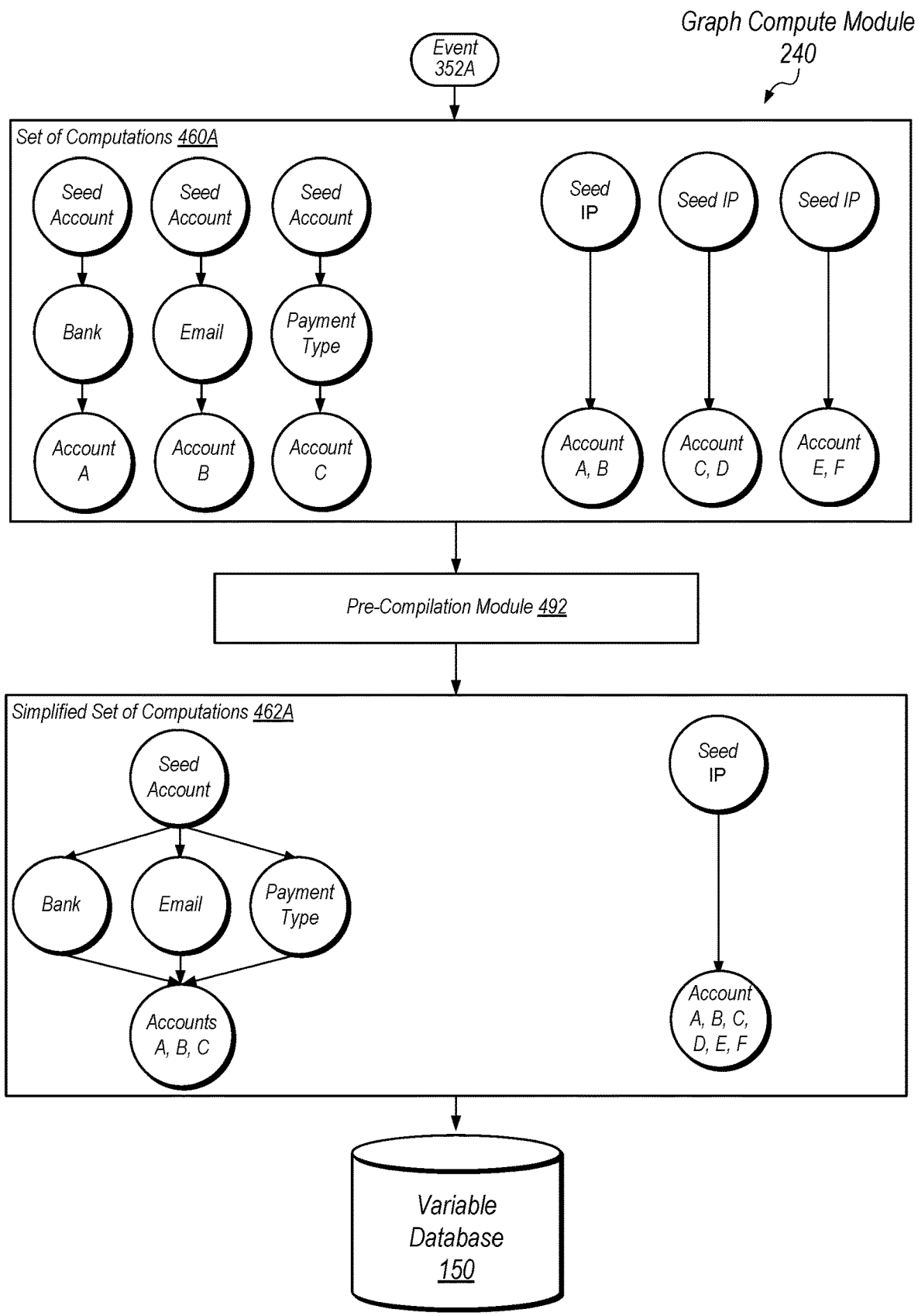
FIG. 4B is a block diagram illustrating an example pre-compilation module, according to some embodiments.

In some embodiments, performance metrics for compute nodes in the various different sets of computations 460A-460N. For example, if the performance of certain compute nodes is poor, then graph compute module 240 may modify sets of computations 460A-460N for similar BOM events 352A-352N going forward to improve computational performance and efficiency. As one example, a BOM event 352 may trigger a batch of graph queries. Some of these queries may have overlap e.g., which may result in duplicate key-value queries to the same graph node or edge within the transaction graph. Turning now to FIG. 4B, a block diagram illustrating an example pre-compilation module 492 is shown. For example in order to avoid duplicate or overlapping queries, graph compute module 240 may execute a pre-compilation module 492 to improve queries to be performed in a set of computations 460. For example, the pre-compilation module 492 may observe a set of queries included in set of computations 460A to be performed for a given trigger event 352A and then combine and simplify these queries such that there is not unnecessary overlap within the transaction graph when these queries are executed.

In FIG. 4B, set of computations 460A is shown to include six different queries. For example, the three queries shown on the left of set of computations 460 include three different queries on the graph database that begin from a seed account. The first of these three queries determines that a first transaction proceeding from the seed account includes a transfer of money from a bank account to account A (which may be a PayPal account, for example). The second of these three queries determines that a second transaction proceeding from the seed account includes an email exchange between the seed account and account B, while the third query determines that a third transaction proceeding from the seed account includes a transfer (a person-to-person payment type) from the seed account to account C. In the illustrated embodiment, these three queries are simplified by pre-compilation module 492 to include a single query that traverses the graphed transaction data from the seed account graph node to determine the three different edges extending out to accounts A, B, and C and involving different types of transactions (e.g., bank transfer, person-to-person payment) and communications (e.g., email) between the see account and the three different accounts.

Similarly, in the illustrated embodiment, three different queries are shown on the right side of set of computations 460A. For example, these queries determine the internet protocol (IP) address for the seed account as well as for various different accounts A, B, C, D, E, and F that the seed account interacts with. Pre-compilation module 492 simplifies these three queries down into a single query that gathers the IP address information for all of these different accounts in a single traversal of the graphed transaction data.

Figure 5:
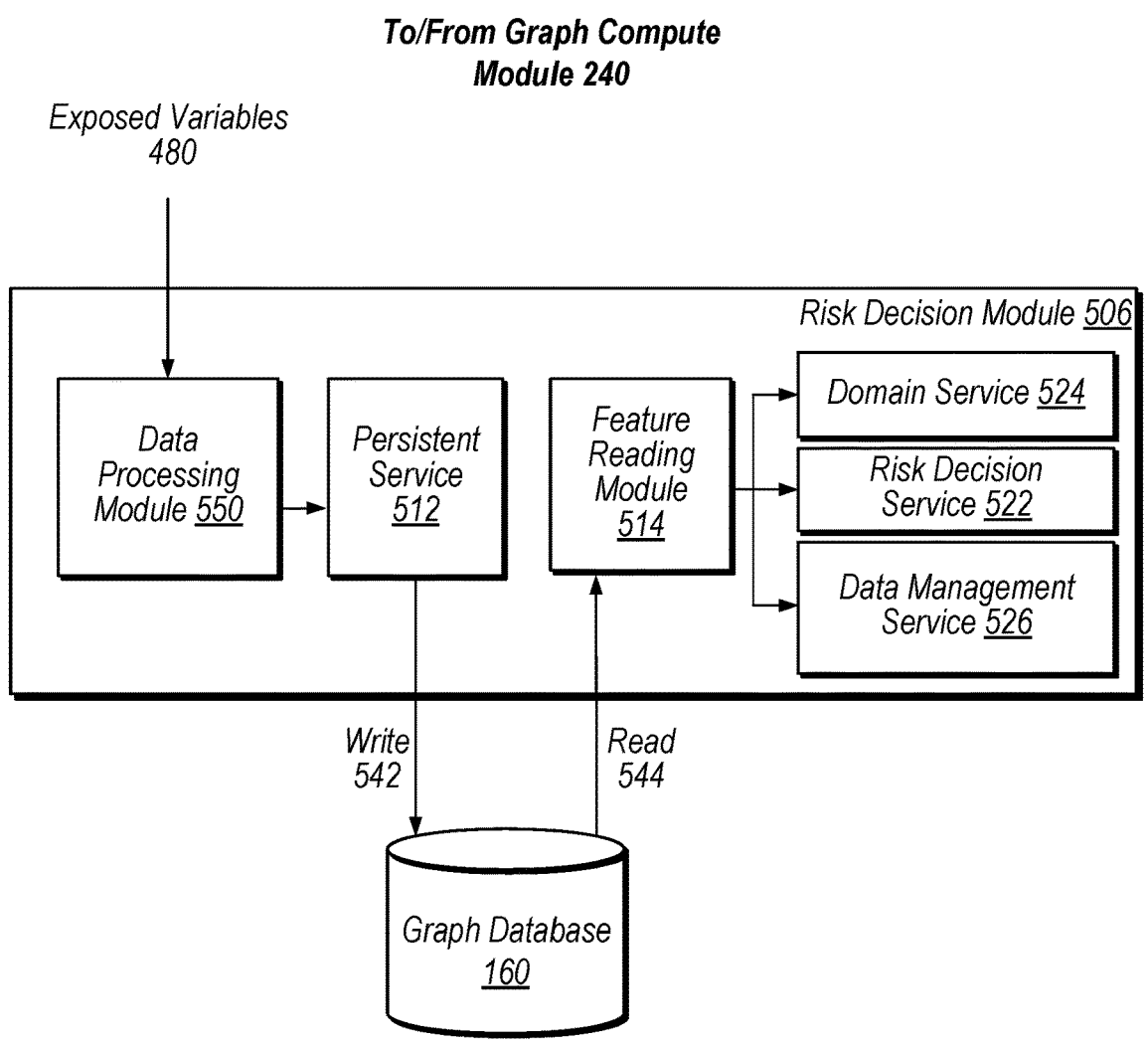
FIG. 5 is a block diagram illustrating an example risk decision module, according to some embodiments.

Turning now to FIG. 5, a block diagram is shown illustrating a risk decision module. In the illustrated embodiment, server system 120 includes graph database 160 and risk decision module 506, which in turn includes data processing module 550, persistent service 512, feature reading module 514, domain service 524, risk decision service 522, and data management service 526. In some embodiments, the graph database 160 shown in FIG. 5 is one instance of a distributed graph database.

In the illustrated embodiment, risk decision module 506 receives exposed variables from graph compute module 240 via data processing module 550 and passes them to persistent service 512. Persistent service 512 performs write operations to store the exposed variables 480 in graph database 160. For example, service 512 may add graph nodes (representing new entities involved in transactions) or edges (representing new transactions completed between different entities) to the graph stored in database 160. The edges include variables 480 (e.g., transaction amount, transaction type, account number, etc.) for various different transactions and entities involved in the transactions. In the illustrated embodiment, feature reading module 514 performs read operations 544 to retrieve various transaction data from graph database 160 and transmits this data to domain service 524, risk decision service 522 and data management service 526. Service 526 may be an enterprise data management service. Services 524, 522 and 526 may perform various different analyses and evaluation operations on the transaction data retrieved from graph database 160. For example, risk decision service 522 may input retrieved transaction data into a machine learning model trained to predict whether a transaction is suspicious (e.g., and ultimately fraudulent).

In some embodiments, server system 120 may perform one or more actions based on analyses and evaluations performed by services 522, 524, and 526 (e.g., fraud prevention, such as blocking a user account associated with suspicious transactions included in the graph data, increasing authentication requirements for the user account, etc.). For example, the graphical transaction data is usable by system 120 to determine whether to alter one or more account parameters for one or more accounts corresponding to rows of raw data stored in database 160 and used to generate the graphed data stored in database 160. Data stored in database 160, for example, may indicate suspicious behavior associated with a given user account. After the results of the computations from graph compute module 240 are stored by module 506 in database 160, the risk decision systems and services are able to make risk decisions for potential transactions (e.g., potential electronic communication 106 shown in FIG. 1) by querying the stored asynchronous results and approving or denying the potential transactions accordingly. In other situations, the asynchronous computations performed by graph compute module 240 may include a final risk approval decision.

Example Variable Database

Figure 6:
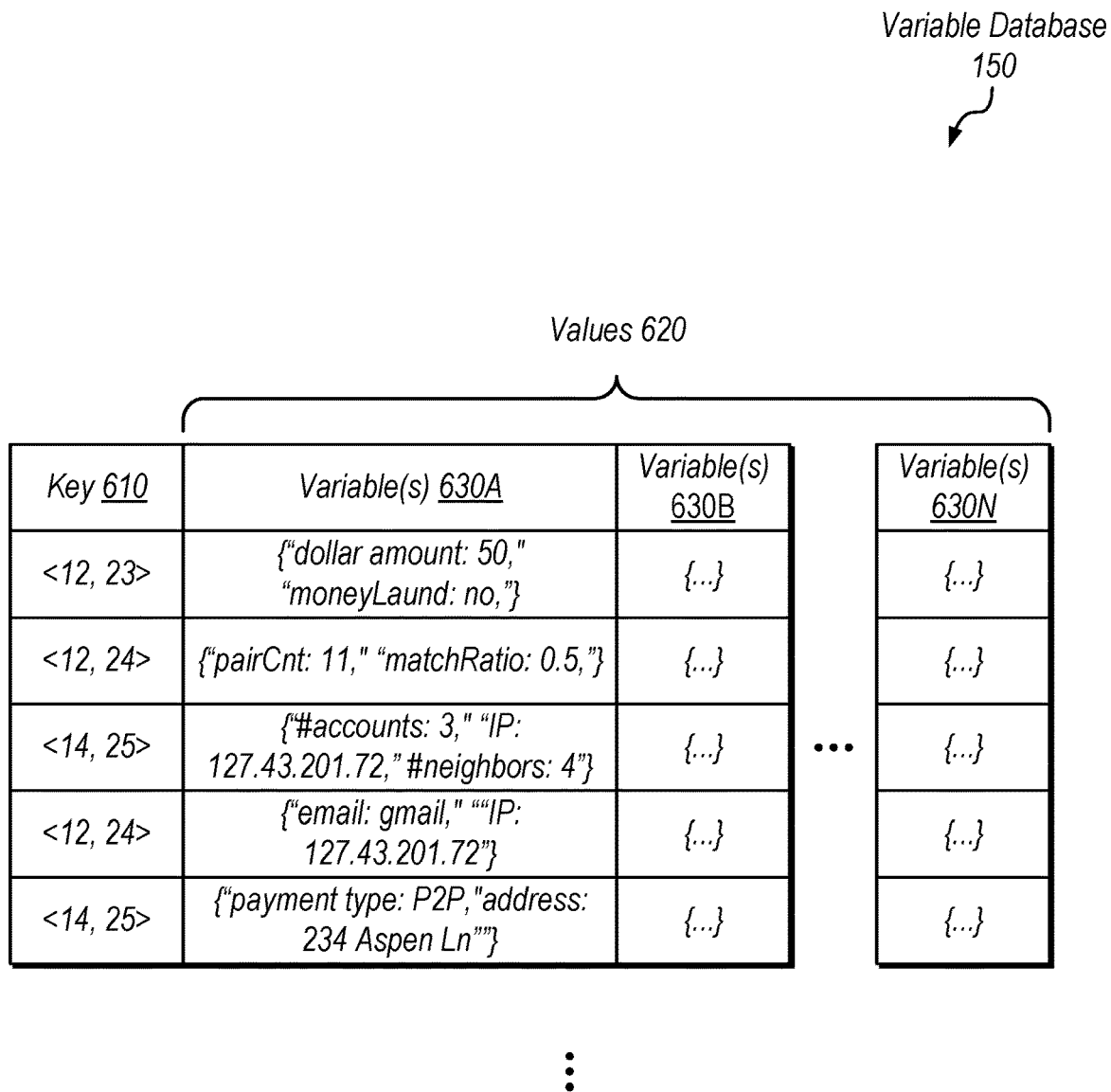
FIG. 6 is a diagram illustrating an example variable database, according to some embodiments.

FIG. 6 is a diagram illustrating an example variable database. In the illustrated embodiment, variable database 450 stores variables exposed by various different sets of computations as key-value pairs in a table format. For example, various keys 610 are shown in the left-most column of database 450, while different variables 630A, 630B, . . . , 630N are shown in the columns to the right of the key 610 column as values 620 corresponding to the keys. These variables 630A-630N may be exposed by various queries executed as part of different sets of computations. While five different rows are shown to be stored in database 450, note that any of various numbers of rows may be stored in the database for various different transactions.

Variables 630A-630N correspond to different compute nodes performed during various different sets of computations 460A-460N (shown in FIG. 4A). Columns in the key-value pair database store different variables calculated by different compute nodes. Due to variable database 450 being a non-relational database, queries on the database are similar to structured query language (SQL) queries. As one specific example, a query may include account numbers for the two entities participating in a given transaction and the variable numbers or column numbers for whichever asynchronously determined variables the query is attempting to retrieve from the variable database 450. A given graph query (compute node) that stores resultant data in database 450 may retrieve multiple variables for a given transaction as shown in FIG. 6.

In the illustrated embodiment, the first row of database 450 includes a key 610 with account numbers 12 and 23. The values 620 stored in the columns corresponding to key <12, 23> include variables 630A (a dollar amount and an indication whether this transaction involved money laundering) retrieved by a query for a transaction processed between account numbers 12 and 23. Similarly, several additional rows are shown in FIG. 6 with keys 610 having account numbers <12, 24>, <14, 25>, <12, 24>, and <14, 25>. Variable 630A may be retrieved via queries on transactions conducted between the account numbers shown in the rows of key 610 column. For example, variable(s) 630A may be information retrieved from graph database 160 including a number of accounts associated with the entity having account 14, an IP address for a device logged into account 14, and a number of nearest neighbor graph nodes within the transaction graph for account 14 (i.e., the graph node representing this account has four nearest neighbors graph nodes). Further in this example, variable(s) 630A include an email associated with and an IP address for account 12. In this example, variable(s) 630A may include an email and IP address for account 24. In some situations, values 620 may store results of compute nodes performing calculations. For example, variable(s) 630B include data that is retrieved from graph database 160, data that is manipulated via various mathematical calculations performed on the retrieved transaction data, etc. This data is then stored in variable database 450 under the column marked "Variable(s) 630B" in FIG. 6.

In some embodiments, variable(s) 630A-630N have corresponding query identifiers. For example, each query on query database 160 may be assigned a unique query ID. Bin names within variable database 450 may be designed by query ID, such that future, different queries may leverage the same generic container (e.g., an Aerospike container) within database 450. Existing queries, once in production, may be altered to add new variables, but are not able to alter existing variables. For example, in disclosed techniques, a generic container for accounts may be generated with a time-to-live (TTL) value of e.g., 90 days in order to save production key spaces.

In some embodiments, a query is a three hop query. For example, a three hop query retrieves transaction data (e.g., payment, phone, banking, etc.) for transactions that occur three graph nodes away from a current graph node (entity) in the graphed transaction data stored in graph database 160. An example graph database query may be the following: g.V( ).hasLabel('IP').has('ipAddress', '10.0.0.1').values ('radd.GrsIpGeo.ACCURACY'). For example, this query will attempt to retrieve the value of GrsIPGeo.ACCURACY from another service called "radd," where the IP address is 10.0.0.1.

Example Method

Figure 7:
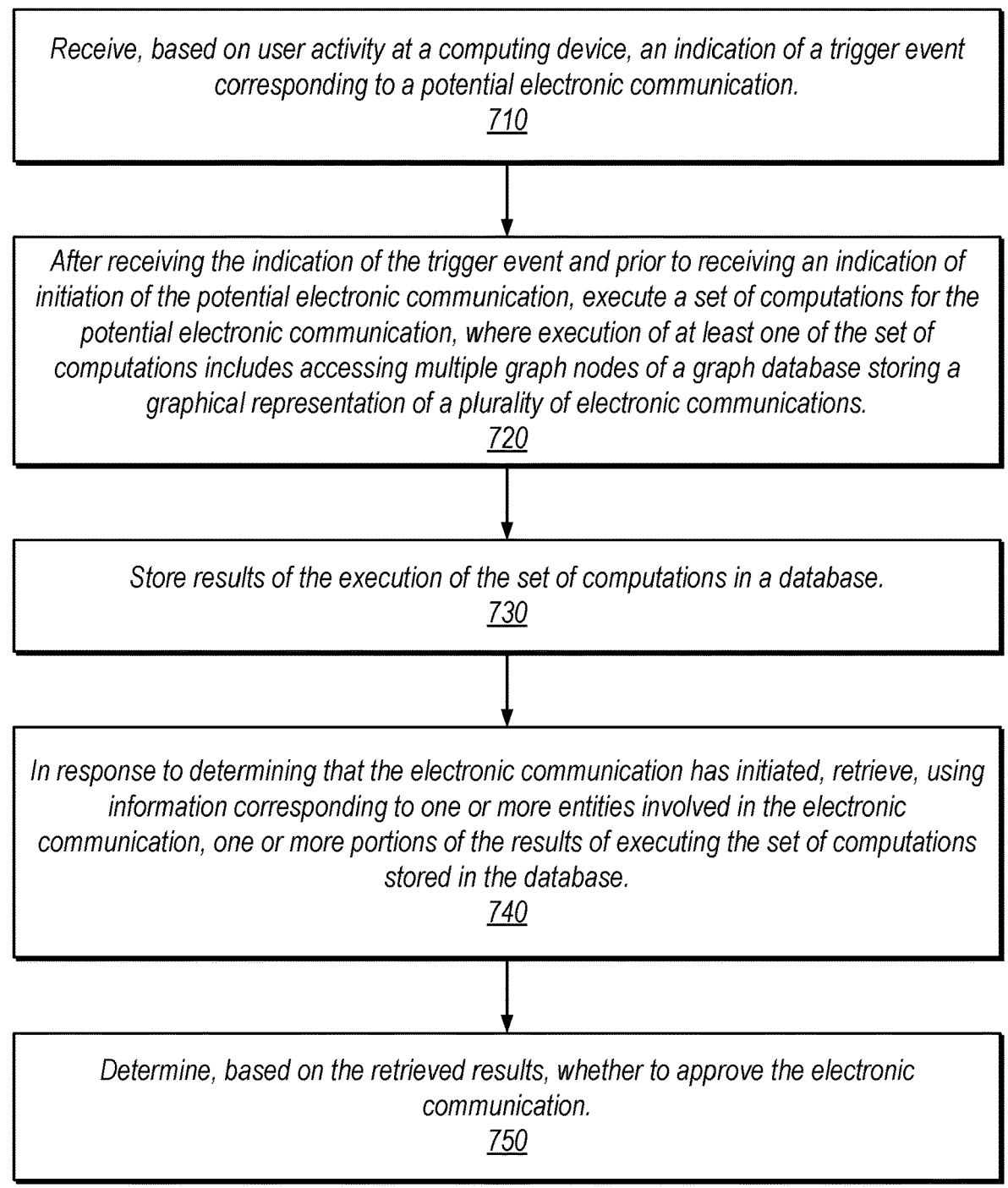
FIG. 7 is a flow diagram illustrating a method for determining whether to approve a potential electronic communication based on executing a set of computations in response to a trigger event associated with the communication and prior to initiation of the electronic communication, according to some embodiments.

FIG. 7 is a flow diagram illustrating a method 700 for determining whether to approve a potential electronic communication based on executing a set of computations in response to a trigger event associated with the communication and prior to initiation of the electronic communication, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server system 120 performs the elements of method 700.

At 710, in the illustrated embodiment, a server system receives, based on user activity at a computing device, an indication of a trigger event corresponding to a potential electronic communication. In some embodiments, in response to receiving the indication of the trigger event, the server system determines, based on the trigger event, one or more types of computations to include in the set of computations, where the determining includes calculating, based on prior activity of a user associated with the trigger event, a likelihood score indicating the likelihood that the user will initiate the potential electronic communication. In some embodiments, the event is a browser object model (BOM) event, where the BOM event indicates one or more user activities within a user interface displayed to the user via their computing device.

In some embodiments, prior to receiving the indication of a trigger event, the server system displays, to via a user interface of a computing device of an entity associated with the potential electronic communication, a plurality of compute nodes. In some embodiments, the server system generates, based on user selection of one or more of the plurality of compute nodes, the set of computations, where the generating includes determining, based on input from the entity at the user interface, an order and of execution for the compute nodes included in the set of computations. In some embodiments, the server system stores the generated set of computations for later presentation to entities associated with potential electronic communications.

At 720, in the illustrated embodiment, after receiving the indication of the trigger event and prior to receiving an indication of initiation of the potential electronic communication, the server system executes a set of computations for the potential electronic communication, where execution of at least one of the set of computations includes accessing multiple graph nodes of a graph database storing a graphical representation of a plurality of electronic communications. As discussed herein, a graphical representation stores e.g., transaction data in the form of graph nodes (representing entities involved in the transactions) and edges (representing the transactions). For example, a graphical representation may be a directed acyclic graph. In some embodiments, the server system updates, using results of the set of computations, the graphical representation stored in the graph database. In some embodiments, accessing the multiple graph nodes includes performing the multi-hop query to retrieve variables from electronic communications occurring at least three graph nodes from a graph node of the potential electronic communication within the graphical representation. For example, the server system may generate a temporary graph node within the graphical representation to represent the potential transaction prior to the transaction being initiated. In some embodiments, performing the multi-hop query to the graph database includes querying the graph database to retrieve one or more of the following types data for the potential electronic communication: account activity of an entity involved in one or more electronic communications, communication amount, communication type, and risk decision history for one or more entities involved in the potential electronic communication. In some embodiments, the set of computations is a directed acyclic graph (DAG). In some embodiments, the plurality of electronic communications are online electronic transactions.

At 730, in the illustrated embodiment, the server system stores results of the execution of the set of computations in a database. In some embodiments, the server system executes a graph compute service to perform the execution of the set of computations, where executing the set of computations includes calling, by the graph compute service, at least one other service. In some embodiments, the set of computations includes at least one of parallel computations and sequential computations. For example, a first compute node included in the set may execute in parallel with a second, different compute node included in the same set.

At 740, in the illustrated embodiment, in response to determining that the electronic communication has initiated, the server system retrieves, using information corresponding to one or more entities involved in the electronic communication, one or more portions of the results of executing the set of computations stored in the database. In some embodiments, the database is a variable database storing results of a plurality of sets of computations as a key-value pairs, where the keys of rows include an identifier of a sender entity and an identifier of a receiver entity involved in respective electronic communications corresponding to the rows. In some embodiments, respective key-value pairs include multiple variable columns storing results of respective computations included in a given set of computations corresponding to a given electronic communication, where respective variable columns store a plurality of different variables.

At 750, in the illustrated embodiment, the server system determines, based on the retrieved results, whether to approve the electronic communication. In some embodiments, the server system rejects the electronic communication. In some embodiments, the server system sends to a computing device associated with the electronic communication, a request for additional authentication information based on determining that the electronic communication is suspicious.

Example Computing Device

Figure 8:
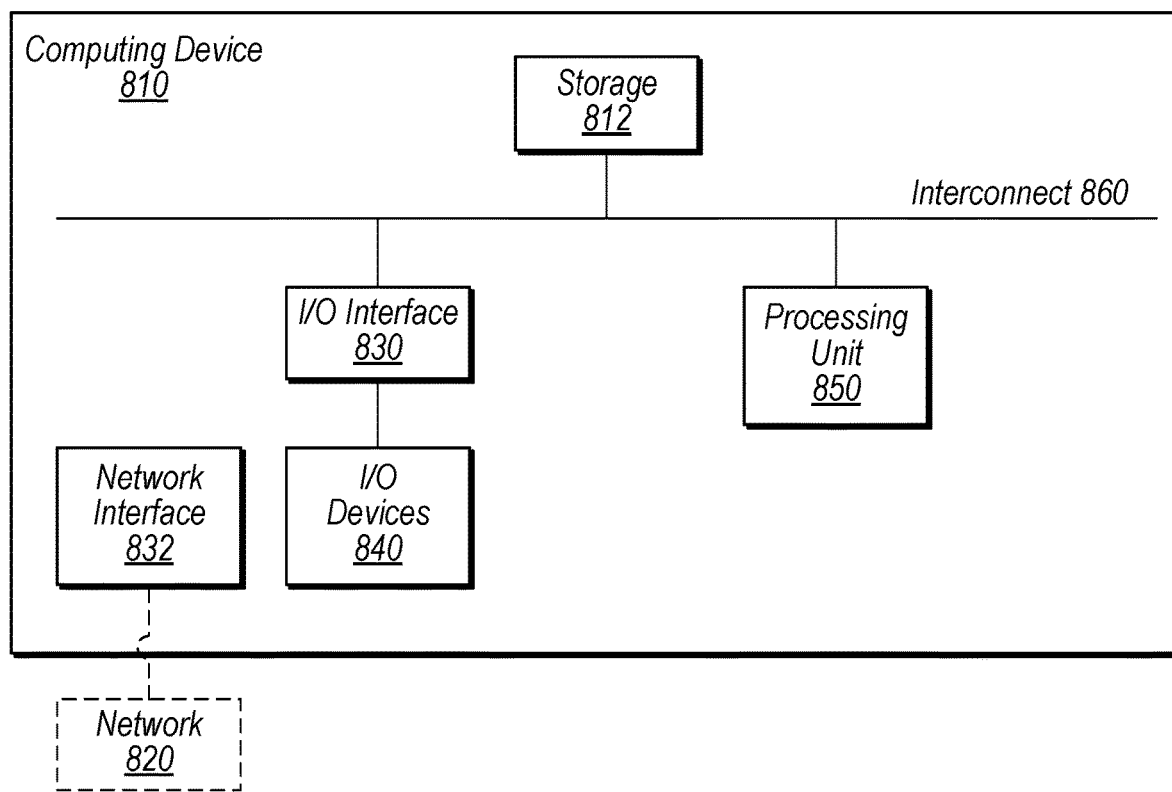
FIG. 8 is a block diagram illustrating an example computing device, according to some embodiments.

Turning now to FIG. 8, a block diagram of one embodiment of computing device 810 (which may also be referred to as a computing system) is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. The server system 120 shown in FIG. 1 and discussed above is one example of computing device 810. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 812 may consist solely of volatile memory, in one embodiment. Non-relational database 160, discussed above with reference to FIG. 1 is one example of storage subsystem 812. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
receiving, by a processor of a server system from a computing device of a user, an indication of a trigger event corresponding to an electronic transaction, wherein the trigger event is a browser object model (BOM) event, wherein the BOM event indicates one or more user actions tracked via a browser of the computing device of the user, and wherein the BOM event triggers an asynchronous computation process;
after receiving the indication of the trigger event and prior to initiation of the electronic transaction, executing, by the processor of the server system, a set of asynchronous computations for the electronic transaction including executing a high volume multi-hop graph database query, wherein executing the high volume multi-hop graph database query includes accessing multiple nodes of a graphical representation of a plurality of prior electronic transactions stored by a graph database;
modifying, by the processor of the server system using results of executing the set of asynchronous computations, the graphical representation stored in the graph database, wherein the modifying includes storing the results of executing the set of asynchronous computations in an edge of the graphical representation in the graph database;
storing, by the processor of the server system in a variable database, the results of executing the set of asynchronous computations;
in response to determining that the electronic transaction has initiated, retrieving, by the processor of the server system using information corresponding to one or more entities involved in the electronic transaction, one or more portions of the results of executing the set of asynchronous computations stored in the variable database;
generating, by the processor of the server system based on one or more portions of the results of executing the set of asynchronous computations retrieved from the variable database, an authorization decision for the electronic transaction; and
transmitting, by the processor of the server system to the computing device of the user, the authorization decision for the electronic transaction.

2. The method of claim 1, wherein prior to the executing and after receiving the indication of the trigger event, the method further comprising:
determining, by the server system based on the indication, the set of asynchronous computations for the electronic transaction, wherein the set of asynchronous computations includes a batch of graph database queries; and
generating, by the server system based on determining that two or more queries in the batch of graph database queries overlap, a single high-volume, multi-hop graph database query to replace the two or more queries in the batch.

3. The method of claim 1, wherein accessing the multiple graph nodes includes retrieving variables from electronic transactions occurring at least three graph nodes from a graph node of the electronic transaction within the graphical representation.

4. The method of claim 1, wherein the server system executes a graph compute service to execute the set of asynchronous computations, and wherein executing the set of asynchronous computations includes calling, by the graph compute service, at least one other service.

5. The method of claim 1, wherein the variable database stores results of a plurality of sets of computations as key-value pairs, wherein keys of rows in the variable database include an identifier of a sender entity and an identifier of a receiver entity involved in respective electronic transactions corresponding to the rows in the variable database, and wherein respective key-value pairs include multiple variable columns storing results of respective computations included in a given set of asynchronous computations corresponding to a given electronic transaction, wherein respective variable columns store a plurality of different variables.

6. The method of claim 1, further comprising:
in response to receiving the indication of the trigger event, determining, by the server system based on the trigger event, one or more types of computations to include in the set of asynchronous computations, wherein the determining includes calculating, based on prior activity of the user, a likelihood score indicating a likelihood that the user will initiate the electronic transaction.

7. The method of claim 1, wherein the set of asynchronous computations includes one or more parallel computations.

8. The method of claim 1, wherein the set of asynchronous computations includes one or more sequential computations.

9. The method of claim 1, wherein executing the multi-hop graph database query includes querying the graph database to retrieve one or more of the following types of data for the electronic transaction: account activity of an entity involved in one or more electronic transactions, transaction amount, transaction type, and risk decision history for one or more entities involved in the electronic transaction.

10. A non-transitory computer-readable medium having instructions stored thereon that are executable by a computing device to perform operations comprising:
   receiving an indication of a trigger event corresponding to an electronic transaction, wherein the trigger event is a browser object model (BOM) event, wherein the BOM event indicates one or more user actions tracked via an application of a user computing device, and wherein the BOM event triggers an asynchronous computation process;
   after receiving the indication of the trigger event and prior to initiation of the electronic transaction, executing a set of asynchronous computations for the electronic transaction including executing a multi-hop graph database query, wherein executing the multi-hop graph database query includes accessing multiple nodes of a graphical representation of a plurality of prior electronic transactions stored by a graph database;
   modifying, using results of executing the set of asynchronous computations, the graphical representation stored in the graph database, wherein the modifying includes storing the results of executing the set of asynchronous computations in an edge of the graphical representation in the graph database;
   storing, in a variable database, the results of executing the set of asynchronous computations;
   in response to determining that the electronic transaction has initiated, retrieving, using information corresponding to one or more entities involved in the electronic transaction, one or more portions of the results of executing the set of asynchronous computations stored in the variable database;
   generating, based on one or more portions of the results of executing the set of asynchronous computations retrieved from the variable database, an authorization decision for the electronic transaction; and
   transmitting, to the user computing device, the authorization decision for the electronic transaction.

11. The non-transitory computer-readable medium of claim 10, wherein accessing the multiple graph nodes includes retrieving variables from electronic transactions occurring at least three graph nodes from a graph node of the electronic transaction within the graphical representation.

12. The non-transitory computer-readable medium of claim 10, wherein the set of asynchronous computations includes at least one of parallel computations and sequential computations.

13. The non-transitory computer-readable medium of claim 10, wherein the variable database stores results of a plurality of sets of computations as key-value pairs, wherein keys of rows in the variable database include an identifier of a sender entity and an identifier of a receiver entity involved in respective electronic transactions corresponding to the rows in the variable database, and wherein respective key-value pairs include multiple variable columns storing results of respective computations included in a given set of asynchronous computations corresponding to a given electronic transaction, wherein respective variable columns store a plurality of different variables.

14. The non-transitory computer-readable medium of claim 10, wherein the operations further comprise, prior to receiving the indication of the trigger event:
   displaying, via a user interface of the user computing device, a plurality of compute nodes; and
   generating, based on user selection of one or more of the plurality of compute nodes, the set of asynchronous computations, wherein the generating includes determining, based on user input at the user interface, an order of execution for the compute nodes included in the set of asynchronous computations; and
   storing the generated set of asynchronous computations for later presentation to entities associated with potential electronic transactions.

15. The non-transitory computer-readable medium of claim 10, wherein the set of asynchronous computations is a directed acyclic graph (DAG).

16. A system, comprising:
   at least one processor; and
   a memory having instructions stored thereon that are executable by the at least one processor to cause the system to:
      receive, from a computing device of a user, an indication of a trigger event corresponding to an electronic transaction, wherein the trigger event indicates one or more user actions tracked via and occurring within a browser of the computing device of the user, and wherein the one or more tracked user actions trigger an asynchronous computation process;
      after receiving the indication of the trigger event, execute a set of asynchronous computations for the electronic transaction including executing a multi-hop query, wherein executing the multi-hop query includes accessing multiple nodes of a graphical representation of a plurality of prior electronic transactions stored by a graph database;
      modify, using results of executing the set of asynchronous computations, the graphical representation stored in the graph database, wherein the modifying includes storing the results of executing the set of asynchronous computations in an edge of the graphical representation in the graph database;
      store results of executing the set of asynchronous computations in a variable database;
      in response to receiving an indication of initiation of the electronic transaction, retrieve, using information corresponding to one or more entities involved in the electronic transaction, one or more portions of the results of executing the set of asynchronous computations stored in the variable database;
      generating, based on the results of executing the set of asynchronous computations retrieved from the variable database, an authorization decision for the electronic transaction; and
      transmitting, to the computing device of the user, the authorization decision for the electronic transaction.

17. The system of claim 16, wherein the instructions are further executable by the at least one processor to cause the system to:
   update, using the results of the set of asynchronous computations, the graphical representation stored in the graph database.

18. The system of claim 16, wherein executing the multi-hop query includes retrieving variables from electronic transactions occurring at least three graph nodes from a graph node of the electronic transaction within the graphical representation, wherein the system executes a graph compute service to execute the set of asynchronous computations, and wherein executing the set of asynchronous computations includes calling, by the graph compute service, at least one other service.

19. The system of claim 16, wherein the variable database stores results of a plurality of sets of computations as key-value pairs, wherein keys of rows in the variable database include an identifier of a sender entity and an identifier of a receiver entity involved in respective electronic transactions corresponding to the rows in the variable database.

20. The system of claim 16, wherein the instructions are further executable by the at least one processor to cause the system to:
  in response to receiving the indication of the trigger event and based on the trigger event, determine one or more types of computations to include in the set of asynchronous computations, wherein the determining includes calculating, based on prior activity of the user, a likelihood score indicating a likelihood that the user will initiate the electronic transaction.

* * * * *